Figure 1:
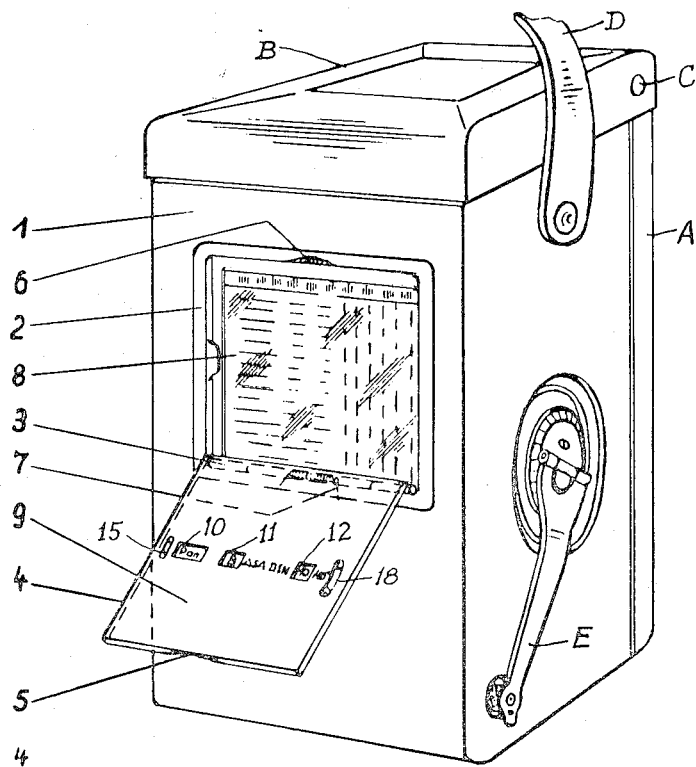

Aug. 9, 1955     R. HEIDECKE     2,714,844

MEMORANDA FIXTURE FOR CAMERA CARRYING CASES

Filed June 17, 1952

Inventor,
Reinhold Heidecke

By Charles Shepard
      Attorney

United States Patent Office 2,714,844
Patented Aug. 9, 1955

2,714,844

MEMORANDA FIXTURE FOR CAMERA CARRYING CASES

Reinhold Heidecke, Braunschweig, Germany, assignor to Franke & Heidecke, Fabrik Photographischer Prazisions-Apparate, Braunschweig, Germany, a firm of Germany Application June 17, 1952, Serial No. 294,031

Claims priority, application Germany February 18, 1952

4 Claims. (Cl. 95—11)

The present invention relates to photography, and more particularly to photographic cameras, and it has for its general object to provide a carrying case for portable hand cameras, which case is structurally fitted with a simple and convenient folding means for displaying charts, scales, tables and the like, useful in the intelligent operation of the camera, and which data are thus made quickly available, upon occasion, to the user.

A further object is to provide, in connection with such display means and the housing and protection thereof, a writing surface and support upon which incidents in the use of the camera may be temporarily jotted down by the operator for future reference.

Another object is to provide, in connection with the said writing support, mechanically adjustable reference markings as for film sensitivity, type of film, or the like, which can be read from the outside through windows in the writing surface.

The invention is particularly applicable to camera carrying cases of what are known as the "ever ready" type and which consist of a box-like structure having an extendable front wall hinged at the bottom to drop forwardly and downwardly, and a flanged cap or top wall hinged to the top of the front wall to initially open upwardly and forwardly and then drop down with the front wall, all to the end that the contained camera may be quickly brought into use without removing it from the case. On such sudden occasion, a full field is thus immediately afforded the lens and, to the same ends, certain of the operating gear of the camera, such as the film winding means, is allowed to project through a side wall of the carrying case and become accessible from the exterior of the latter.

The invention is further particularly applicable to such ever ready carrying cases for cameras of the type having a reflex finder chamber disposed above the photographic chamber wherein the top and front covers may be folded forwardly and downwardly in order to expose the lenses for focusing also. Such carrying cases have the advantage that their rear wall presents a smooth surface, such that they can be worn slung over the shoulder without projecting parts, such as knobs or buckles, rubbing against the user's person. It is a further object of the invention to equip this rear wall with the facilities first mentioned so that they will be accessible at any time and yet preserve the advantages last mentioned.

Figure 2:
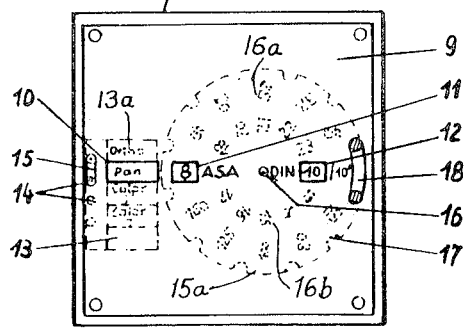

These and other desirable objects may be attained in the manner disclosed as an illustrative embodiment of the invention in the following description and in the accompanying drawings forming a part hereof, in which:

Fig. 1 is a rear perspective view of a camera carrying case provided with the display and memoranda writing means, the latter being in its extended or operative position; and Fig. 2 is an enlarged plan view of the writing and display support, alone in further detail.

The same reference numerals throughout the several views indicate the same parts.

Referring more particularly to the drawings, 1 indicates a camera carrying case of the nature above outlined, the front wall A being suitably hinged to the body of the case at the bottom to unfold forwardly and downwardly, and the top wall or cap B being in turn hinged to the forward wall A at C to follow it. The carrying strap D is attached to both side walls and through an opening in one of the latter projects the folding crank E on the film winding mechanism of the contained camera.

Let into the rear wall 1 of the casing is a metal frame 2 flush with the surface of the wall, to the bottom of which is hinged at 3 a cover flap 4 shown in the drawing extended to operative position for the purposes hereinafter described, but which when closed seals the frame 2, and with it also lies flush with the surface of the rear wall 1 of the case. The hinge 3 is a spring hinge motivated by a spring 7 to such normal closed position. To provide the operator with means for opening the normally closed flap or cover, the latter is provided on the free edge opposite the hinge with a notch 5, and on the frame 2 there is provided at the top a recess 6 for the finger tip. When the flap 4 is open, the frame 2 outlines a window through which may be read the information on any desired data table 8 mounted on the rear wall of the camera body, such as an exposure table, focal length table, or the like. The window for reading this table 8 may be entirely open, or preferably may be closed by a transparent plate or panel, as indicated in the drawing, which panel is set inwardly in the wall of the carrying case so as to avoid interference with the closing of the cover flap 4.

The inner surface of the cover flap 4 is formed by a separate plate 9, shown in greater detail in Fig. 2, and superposed in spaced relation to the body of the flap with suitable fastening means at the corners. The upper and outer surface of this plate 9 is suitably prepared to receive temporary notes and writings, made with a pencil or similar instrument, to record such notes as the user desires to make in connection with his successive exposures and similar matter. It may consist of a lacquered mat surface, or it may be mechanically or electrolytically matted to prepare it for use as a writing surface for the said temporary memoranda.

Additionally, the matted plate is provided, in the present instance, with three windows 10, 11 and 12. Beneath the window 10 is suitably slidably mounted between the flap plate 4 and the cover and writing plate 9, a slide strip 13 which is provided along one margin with a row of equally spaced bores or notches 14 forming abutments in alignment with a slot 15 in the cover plate. By means of these abutments, and with the use of a pencil point or similar instrument to engage them, the slide 13 may be advanced step by step in both directions from the outside. Any one of a series of panels 13$^a$ may thus be brought, selectively, to view in the window 10. The panels bear other technical information, such as the nature of the particular film with which the contained camera has been loaded, such as panchromatic, color, etc. as is indicated in Fig. 2.

The other two windows 11 and 12 are designed, in the present embodiment, to display other characteristics of the film or particular sensitized surface being used, such as film sensitivity. To obtain greater capacity than can be secured by using a slide like 13, the film speed markings are preferably placed on a rotary dial 15$^a$ turning upon a pin 16 between the plates 4 and 9. The dial is circularly graduated with outer and inner indicia 16$^a$ and 16$^b$ respectively representing ASA and DIN speed ratings of various films which may be used in the camera, for the simultaneous indication of these speed ratings in the respective windows 11 and 12, according to whether or not the German or American Standard system is used. As shown, the circumferential arrangement of characters provides for both.

The dial 15ª is rotated to register the various readings in the same manner as is the slide 13 before described, namely, a segmental slot 18 is provided in the cover plate through which abutments 17 on the margin of the dial become accessible to permit the thrust of a pencil point to advance the disk the length of slot 18 in either direction, which length corresponds to the spacing of the characters on the disk.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. An ever-ready carrying case for a photographic camera of the twin lens reflex type having an exposure table on a rear wall of the camera, said case having a front wall section movable from closed position downwardly and forwardly to an open position to uncover the lens of a camera contained in the carrying case to enable the taking of a picture while the camera remains in the case, a recess forming a window in the rear wall of the case substantially opposite the exposure table on a camera held within said case, a flap hinged to the rear wall of said case substantially at the lower edge of said window recess for closing said recess, said flap when closed being set into the recess to provide a closure surface substantially flush with the rear wall of the case so that the rear wall of the case presents a substantially smooth surface for contact with the clothing of a person carrying the case, said flap being mounted to swing outwardly and downwardly to make the inner surface of said flap accessible externally of said case, the inner surface of said closure flap being formed as a writing surface on which temporary notes may be written, a movable film type indicator and a movable film speed indicator both adjustably mounted on said closure flap in position to be observed when said flap is opened to usable writing position.

2. A construction as defined in claim 1, in which said closure flap is hollow and is provided with an observation window and an adjusting slot, and in which at least one of said indicators includes a movable member mounted inside the hollow closure flap and having a plurality of indicia successively observable through said observation window when said member is moved to successive positions, said movable member also having a series of abutments alined with said slot and adapted to be engaged by a pencil point inserted in the slot to move the movable member from one position to another.

3. A construction as defined in claim 2, in which said film type indicator includes a reciprocating slide.

4. A construction as defined in claim 2, in which said film speed indicator includes a rotary disk.

References Cited in the file of this patent

UNITED STATES PATENTS

| 1,980,546 | Petit et al. | Nov. 13, 1934 |
| 2,590,161 | Dorsey | Mar. 25, 1952 |

OTHER REFERENCES

"International Photographer," August 1935, Article on page 11.